(12) United States Patent
Martinez Munoz

(10) Patent No.: US 10,967,979 B2
(45) Date of Patent: Apr. 6, 2021

(54) AIRCRAFT WITH REAR MOUNTED ENGINES

(71) Applicant: Airbus Operations S.L., Getafe (ES)

(72) Inventor: Jose Luis Martinez Munoz, Getafe (ES)

(73) Assignee: Airbus Operations S.L., Getafe (ES)

( * ) Notice: Subject to any disclaimer, the term of this patent is extended or adjusted under 35 U.S.C. 154(b) by 338 days.

(21) Appl. No.: 16/067,655

(22) PCT Filed: Dec. 22, 2016

(86) PCT No.: PCT/EP2016/082308
§ 371 (c)(1),
(2) Date: Jul. 2, 2018

(87) PCT Pub. No.: WO2017/114732
PCT Pub. Date: Jul. 6, 2017

(65) Prior Publication Data
US 2019/0009915 A1    Jan. 10, 2019

(30) Foreign Application Priority Data

Dec. 31, 2015 (EP) .................... 15382681

(51) Int. Cl.
*B64D 27/02* (2006.01)
*B64C 5/02* (2006.01)
(Continued)

(52) U.S. Cl.
CPC ............... *B64D 27/10* (2013.01); *B64C 5/02* (2013.01); *B64C 5/16* (2013.01); *B64C 5/18* (2013.01);
(Continued)

(58) Field of Classification Search
CPC ........ B64D 27/02; B64D 27/10; B64D 27/00; B64D 2027/005; B64D 29/02; B64C 5/02; B64C 5/16; B64C 5/18; B64C 3/32
See application file for complete search history.

(56) References Cited

U.S. PATENT DOCUMENTS 3,652,035 A   3/1972  Fredericks
5,779,191 A   7/1998  Brislawn
(Continued)

FOREIGN PATENT DOCUMENTS

GB   1112924   5/1968
GB   2445555   7/2008
(Continued)

OTHER PUBLICATIONS

International Search Report, dated Feb. 23, 2017, priority document.

*Primary Examiner* — Philip J Bonzell
*Assistant Examiner* — Tye William Abell
(74) *Attorney, Agent, or Firm* — Greer, Burns & Crain, Ltd.

(57) ABSTRACT

An aircraft with rear mounted engines, comprising a vertical tail plane and a horizontal tail plane, in which the engines are mounted on top of the horizontal tail plane, such that the horizontal tail plane comprises an inner fixed part attached to the fuselage of the aircraft, the inner fixed part comprising an elevator, and two outer movable parts, each one of the outer movable parts being located at each side end of the horizontal tail plane which is furthest away from the fuselage of the aircraft, such that both the inner fixed part and the outer movable parts are at least partially subjected to a flow coming from the engines when the engines are in use.

20 Claims, 14 Drawing Sheets

(51) Int. Cl.
*B64D 27/10* (2006.01)
*B64C 5/16* (2006.01)
*B64C 5/18* (2006.01)
*B64D 27/00* (2006.01)

(52) U.S. Cl.
CPC ............ B64D 27/00 (2013.01); B64D 27/02 (2013.01); *B64D 2027/005* (2013.01); *Y02T 50/40* (2013.01); *Y02T 50/60* (2013.01)

(56) References Cited

U.S. PATENT DOCUMENTS

| | | | |
|---|---|---|---|
| 6,199,795 B1 * | 3/2001 | Williams | B64C 1/00 244/130 |
| 2008/0245925 A1 | 10/2008 | Udall | |
| 2009/0020643 A1 * | 1/2009 | Gall | B64D 27/14 244/54 |
| 2009/0289144 A1 * | 11/2009 | Koneczny | B64C 9/08 244/87 |
| 2010/0032518 A1 | 2/2010 | Saint-Jalmes et al. | |
| 2011/0286842 A1 * | 11/2011 | Danielson | B64C 11/306 416/1 |
| 2016/0244150 A1 * | 8/2016 | Hirano | B64C 5/06 |

FOREIGN PATENT DOCUMENTS

| | | |
|---|---|---|
| WO | 9821092 | 5/1998 |
| WO | 2008096073 | 8/2008 |

\* cited by examiner

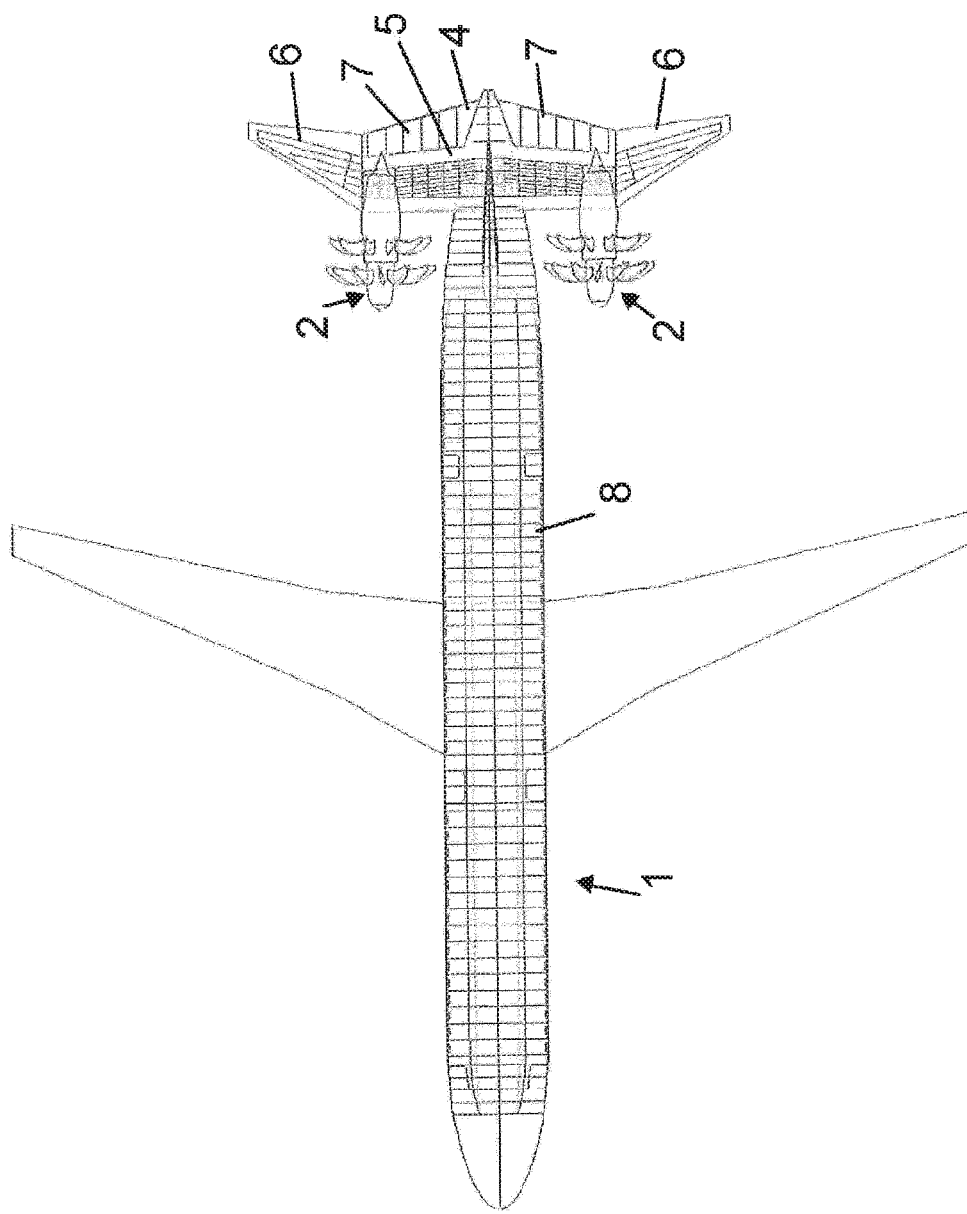

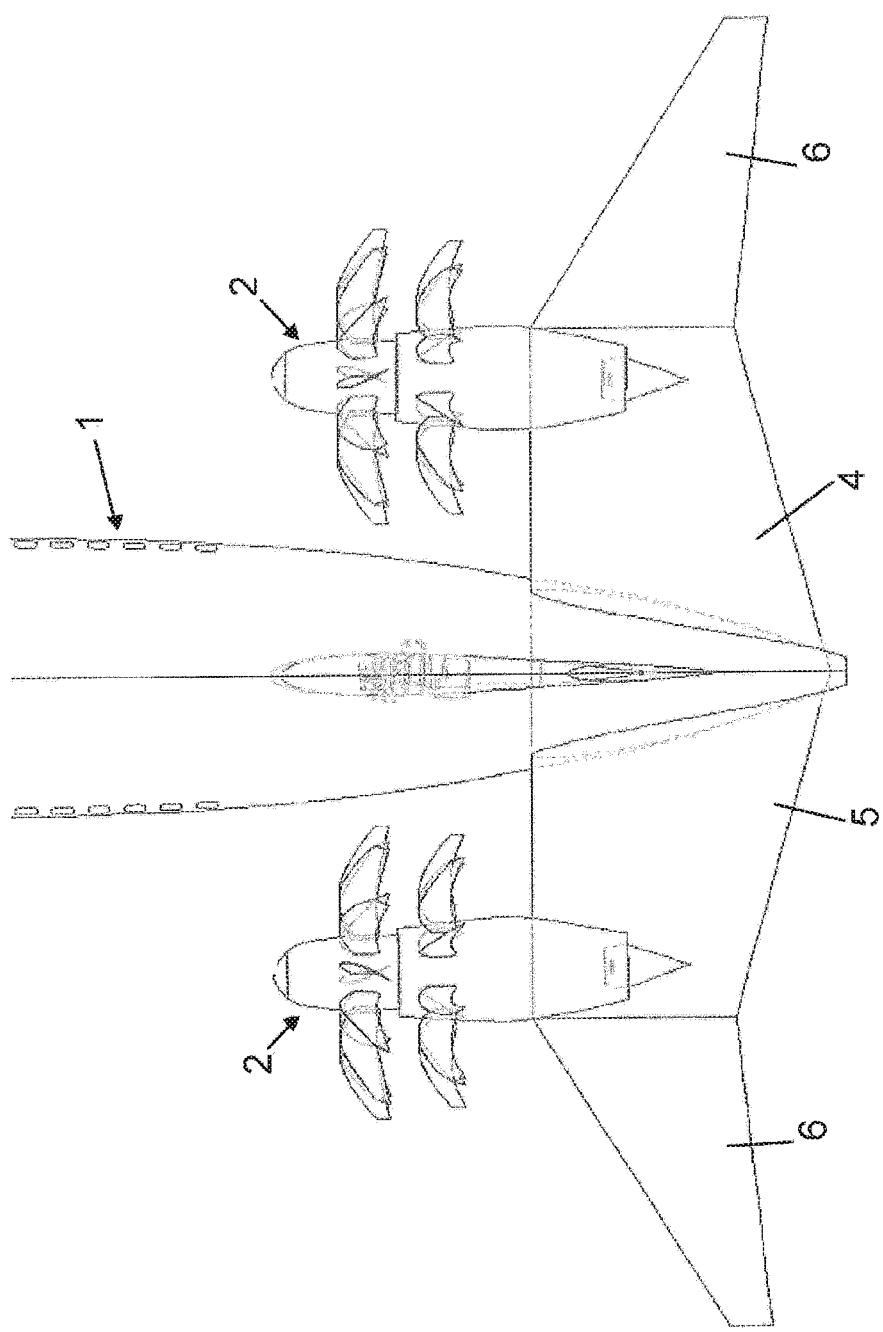

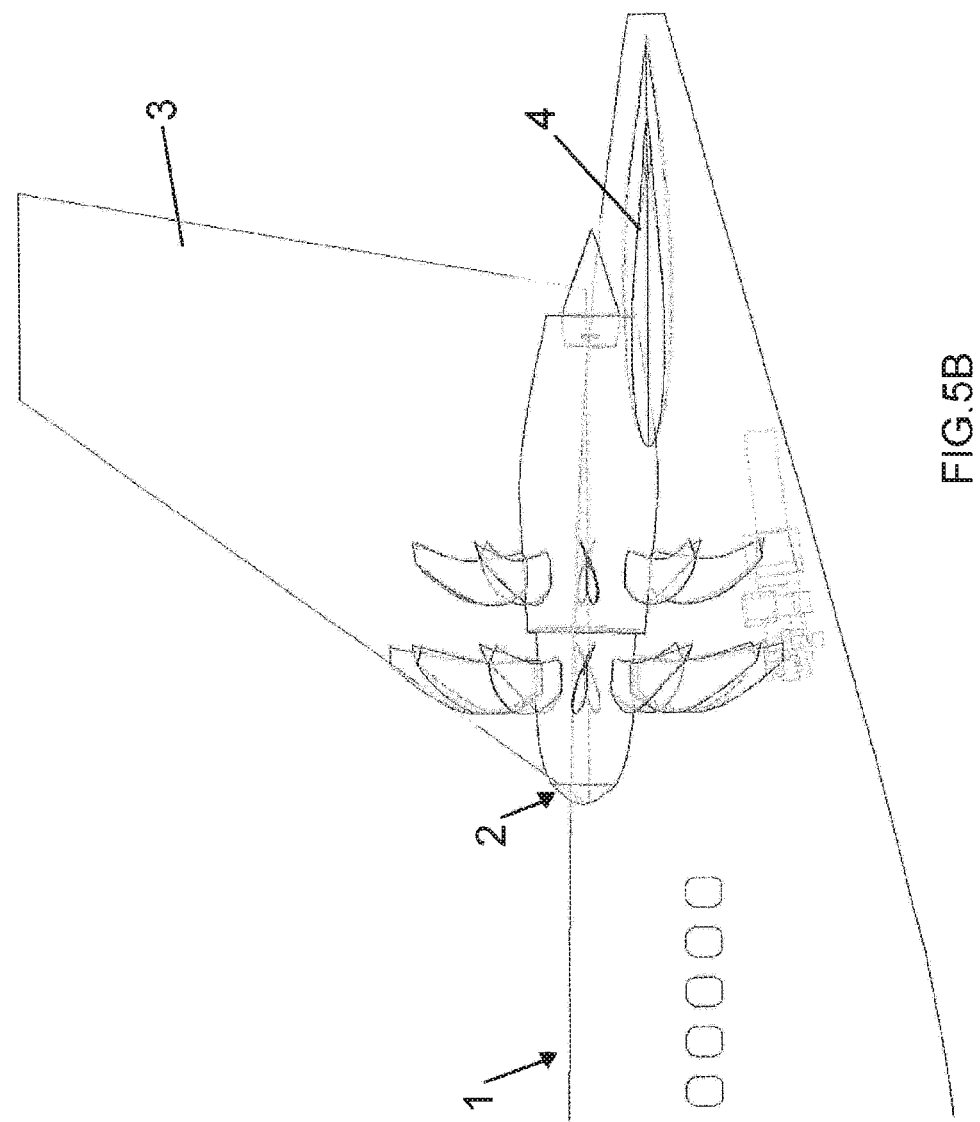

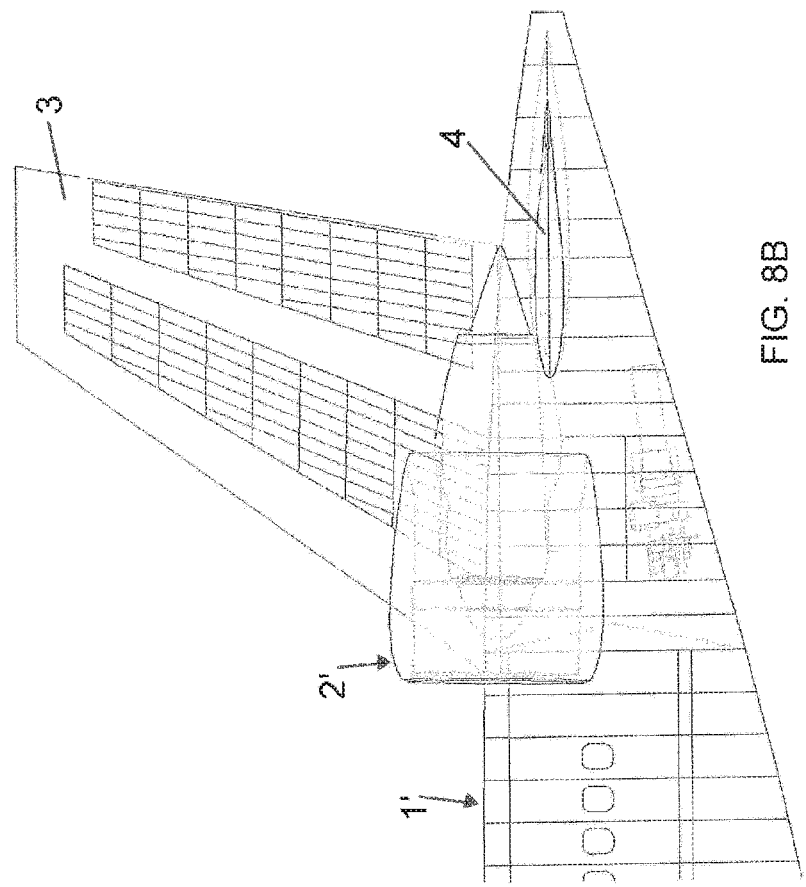
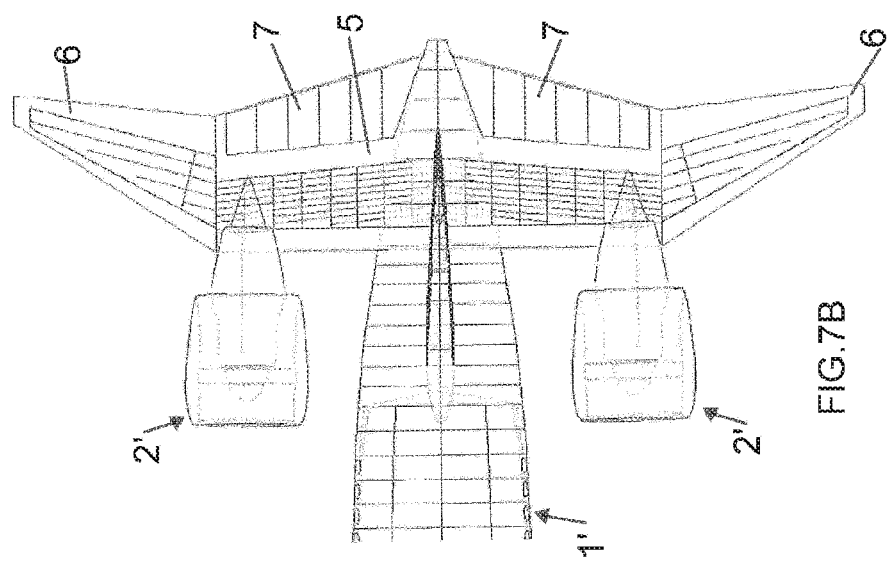
FIG. 8B
FIG. 7B

AIRCRAFT WITH REAR MOUNTED ENGINES

CROSS-REFERENCES TO RELATED APPLICATIONS

This application claims the benefit of the European patent application No. 15382681.3 filed on Dec. 31, 2015, the entire disclosures of which are incorporated herein by way of reference.

FIELD OF THE INVENTION

The present invention relates to an aircraft with rear mounted engines, in which the engines are mounted at the horizontal tail plane of the aircraft.

BACKGROUND OF THE INVENTION

The rear mounted installation of the engines in an aircraft is preferred in certain cases, for instance, when installing ultra high bypass ratio engines, propeller engines and/or contra rotating open rotor (CROR) engines. In these cases, due to the high diameter of the engines and/or the noise they produce, or just because it is preferred to have a clean wing, a rear mounted installation is sometimes preferred. In these aircraft, the horizontal tail is usually moved to the top of the vertical tail, this configuration being known as a "T-tail".

The mounting of the engines to the aircraft is usually achieved via conventional huge pylons on the rear portion of the fuselage of the aircraft. These pylons do not perform any other function apart from sustaining the engines.

Some proposals, as the ones disclosed in GB 2445555 A or WO 98/21092 A1, provide aircraft in which the engines are located towards the aft of the aircraft, close to the tail end.

GB 1112924, referred to "Improvements in or relating to Aircraft", discloses an aircraft including a main wing having trailing edge flaps guided in the wing for chordwise motion relative thereto, and a tail assembly having horizontal and vertical control surfaces and at least two power driven propellers supported by the tail assembly, the propellers being positioned on both sides of the longitudinal axis of the aircraft in the vicinity of the rear of the wing so that in the rearwardly deflected position of the flaps the rear edges of the flaps are closely adjacent the lower part of the propeller-disk area, said horizontal and vertical control surfaces being positioned so that the slip stream of the propellers sweeps over said surfaces.

These prior art configurations provide different aircraft in which the engines are mounted in the rear part of the aircraft. However, it is desirable to have an aircraft with rear mounted engines and with control surfaces located at the rear part of the aircraft which can provide an improved efficiency of the control surfaces.

SUMMARY OF THE INVENTION

Therefore, an object of the invention is to provide an aircraft with rear mounted engines that can provide an improved efficiency of the control surfaces.

The invention provides an aircraft with rear mounted engines, comprising a vertical tail plane and a horizontal tail plane, in which the engines are mounted on top of the horizontal tail plane, such that the horizontal tail plane comprises an inner fixed part attached to the fuselage of the aircraft, the inner fixed part comprising an elevator, and two outer movable parts, each one of the outer movable parts being located at each side end of the horizontal tail plane which is furthest away from the fuselage of the aircraft, such that both the inner fixed part and the outer movable parts are at least partially subjected to the flow coming from the engines when they are in use.

The configuration of the horizontal tail plane, in conjunction with the fact that the engines are located on top of the horizontal tail plane, allows an improved efficiency of the control surfaces located at the rear part of the aircraft.

In effect, with this configuration the elevator and the movable parts of the horizontal tail plane are blown with flow coming from the engines, so the aircraft can be trimmed in an improved way, reducing the drag considerably. This effect can be specially improved during take-off and landing.

Besides that, by positioning the engines on top of the horizontal tail plane of the aircraft, when the plane rotates for take-off or landing the risk of impact of the engines with the ground is eliminated. This problem is particularly important for aircraft with a long fuselage and engines at the back.

Other advantageous embodiments will be described in the dependent claims.

BRIEF DESCRIPTION OF THE DRAWINGS

For a more complete understanding of the present invention, it will be described below in greater detail, making reference to the attached drawings, in which:

FIG. 4A is a plan view of an aircraft of the invention.

FIG. 4B shows a detail of the rear part of the aircraft of FIG. 4A.

FIG. 5B shows a detail of the rear part of the aircraft of FIG. 5A.

FIG. 7B shows a detail of the rear part of the aircraft of FIG. 7A.

FIG. 8B shows a detail of the rear part of the aircraft of FIG. 8A.

DETAILED DESCRIPTION OF THE PREFERRED EMBODIMENTS

The figures show two embodiments of aircraft of the invention: a first aircraft 1 (FIGS. 1 to 5B and FIG. 12) and a second aircraft 1' (FIGS. 6 to 11).

In both aircraft 1, 1' the engines 2, 2' are mounted in its rear part. The aircraft 1, 1' have a single vertical tail plane (VTP) 3 and a horizontal tail plane (HTP) 4, and the engines 2, 2' are mounted on top of the horizontal tail plane 4, as can be seen in all the figures.

Figure 1:
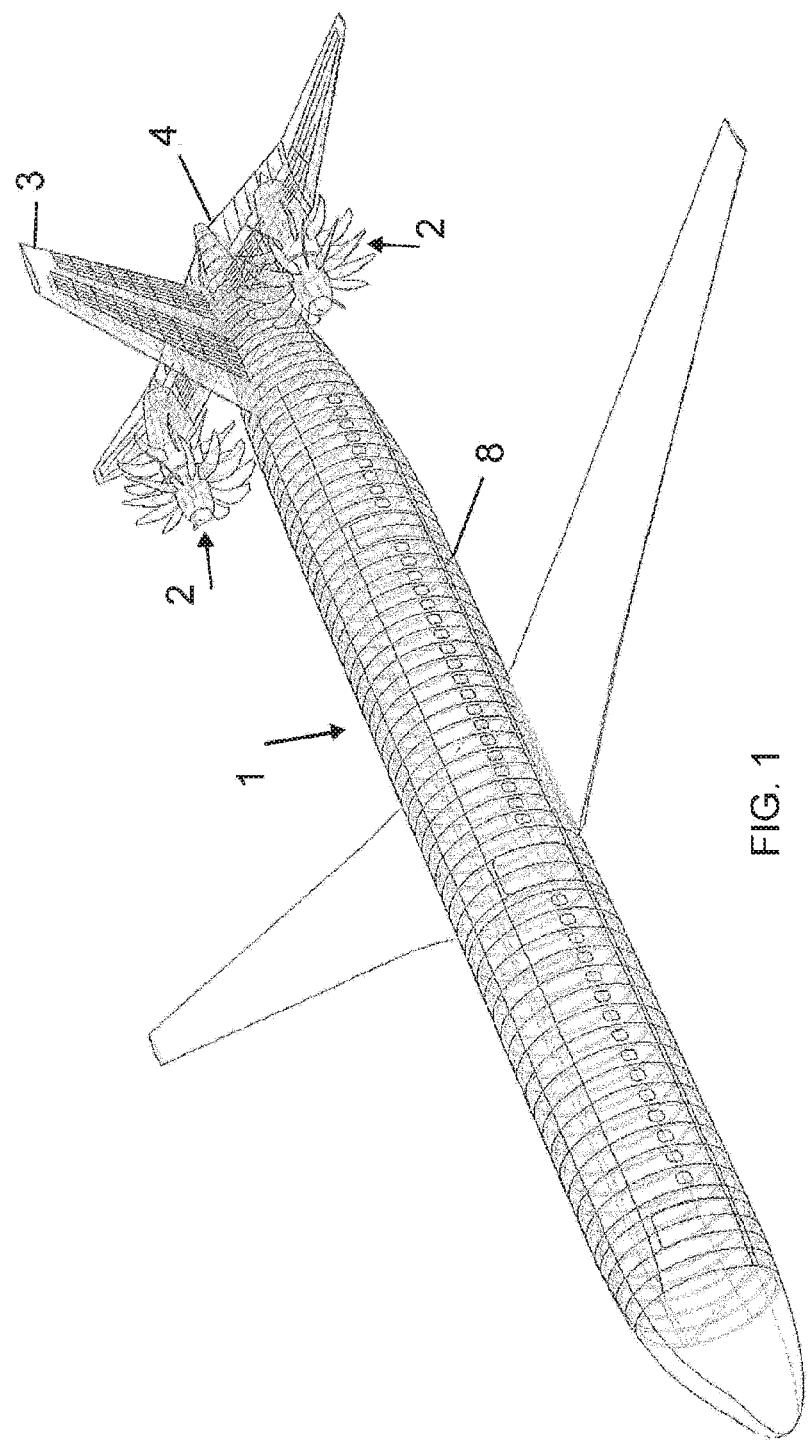
FIG. 1 is a front perspective view of an aircraft of the invention.
Figure 2:
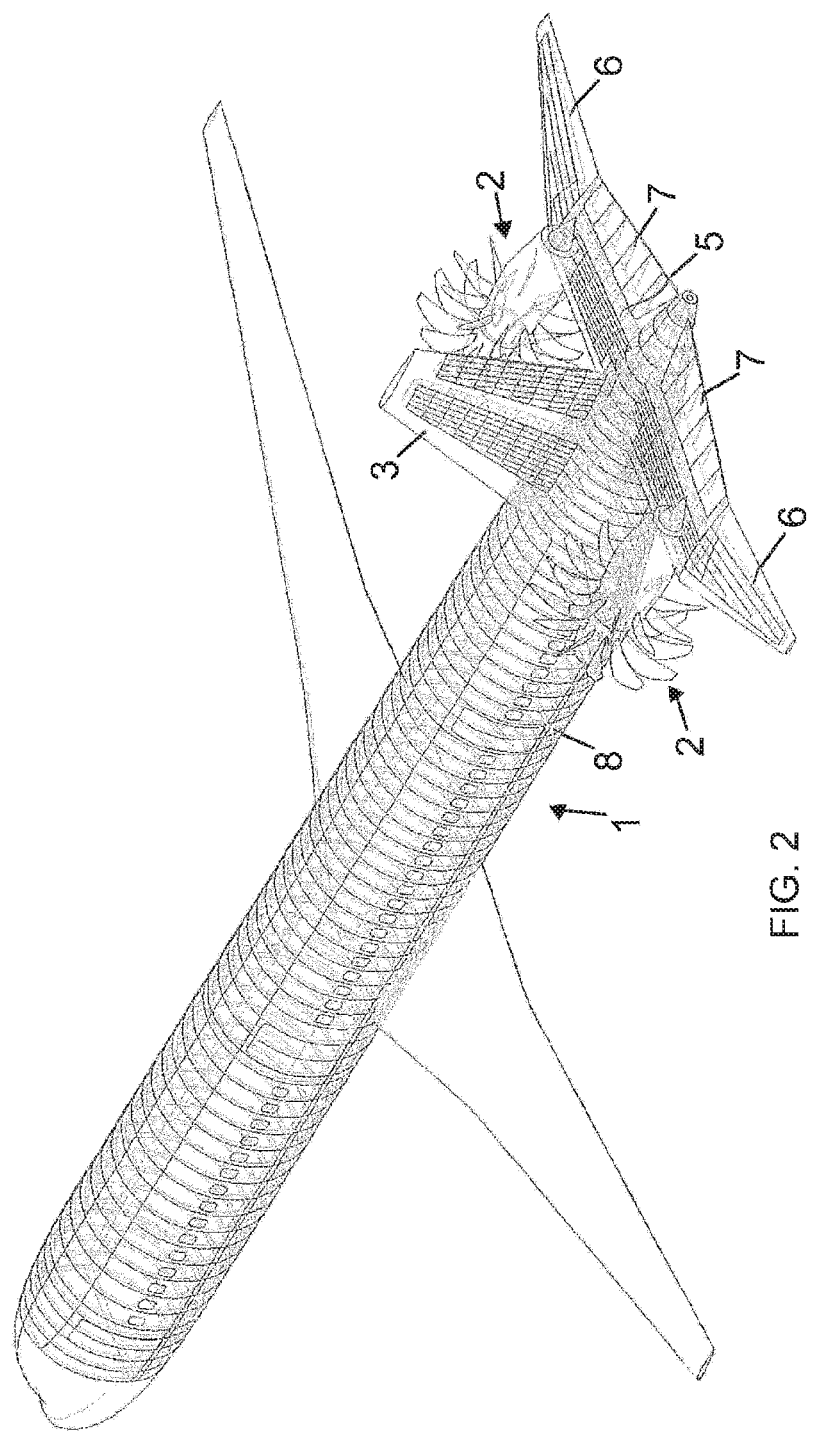
FIG. 2 is a rear perspective view of an aircraft of the invention.
Figure 3:
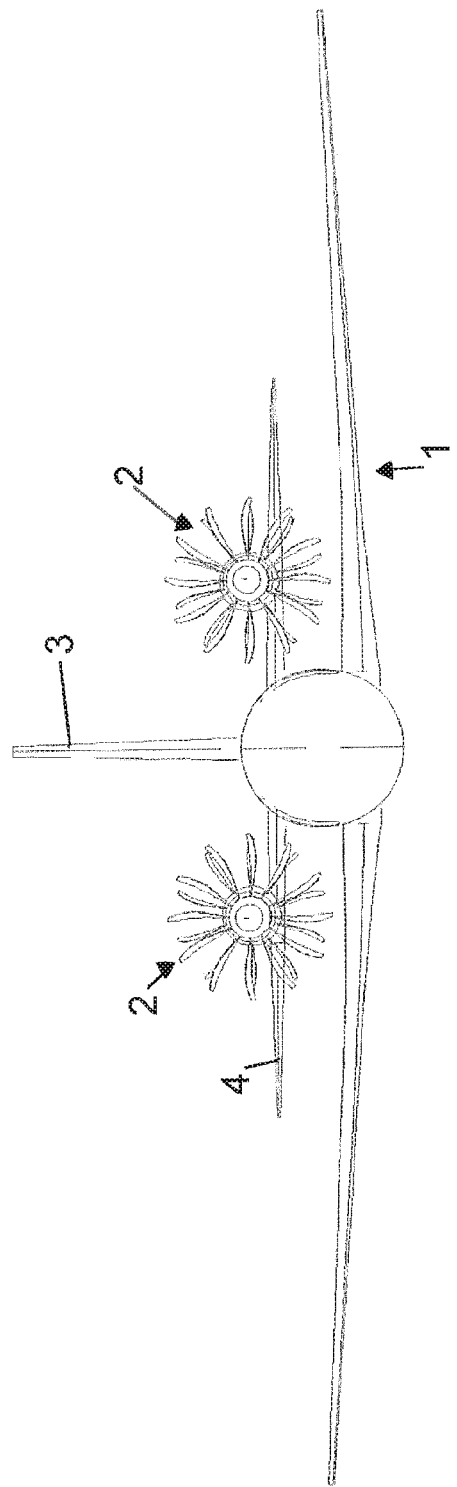
FIG. 3 is a front view of an aircraft of the invention.
Figure 5A:
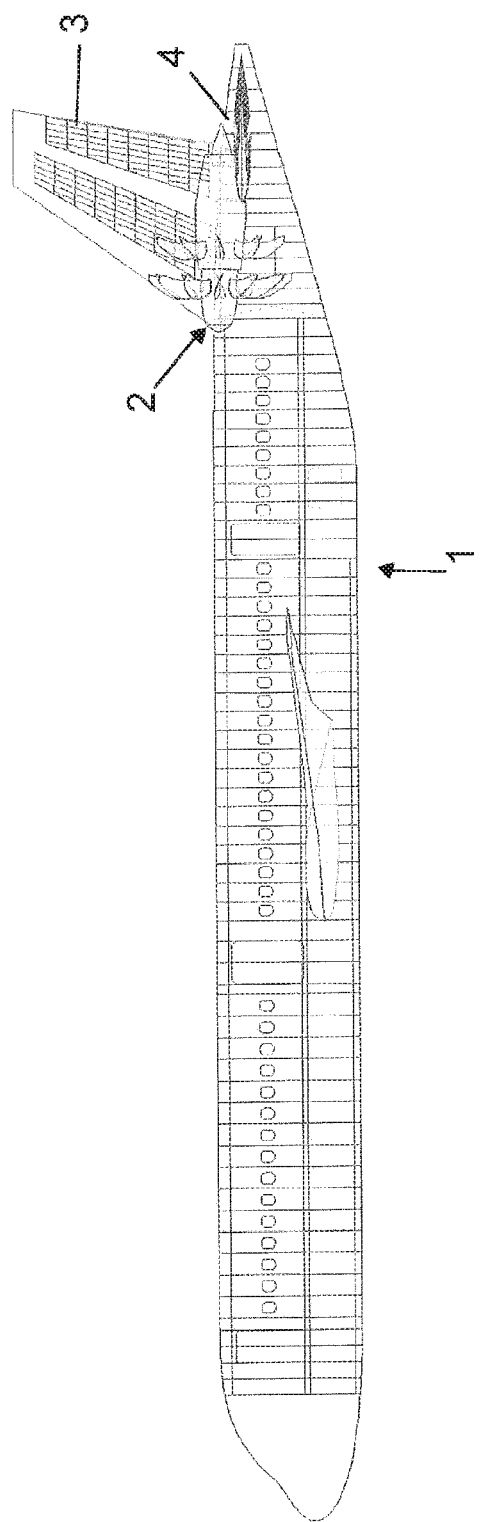
FIG. 5A is a side view of an aircraft of the invention.
Figure 6:
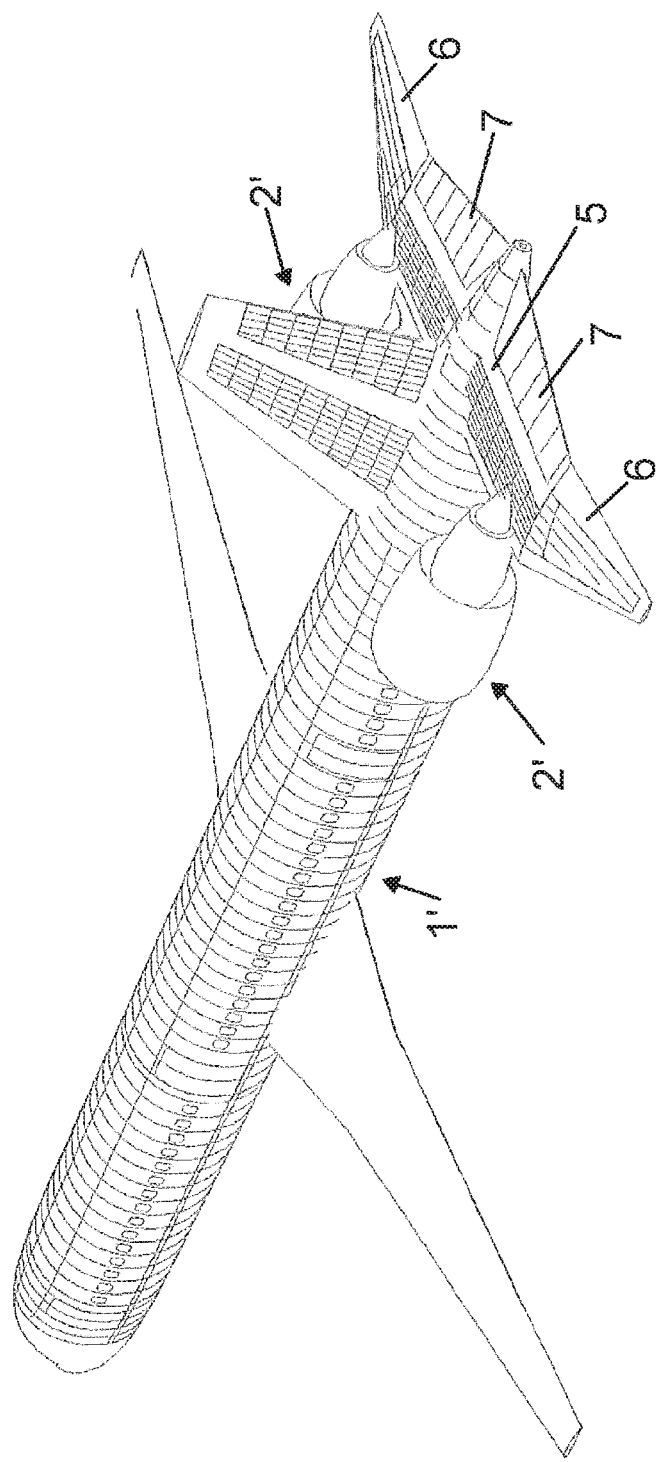
FIG. 6 is a rear perspective view of a second aircraft of the invention.
Figure 7A:
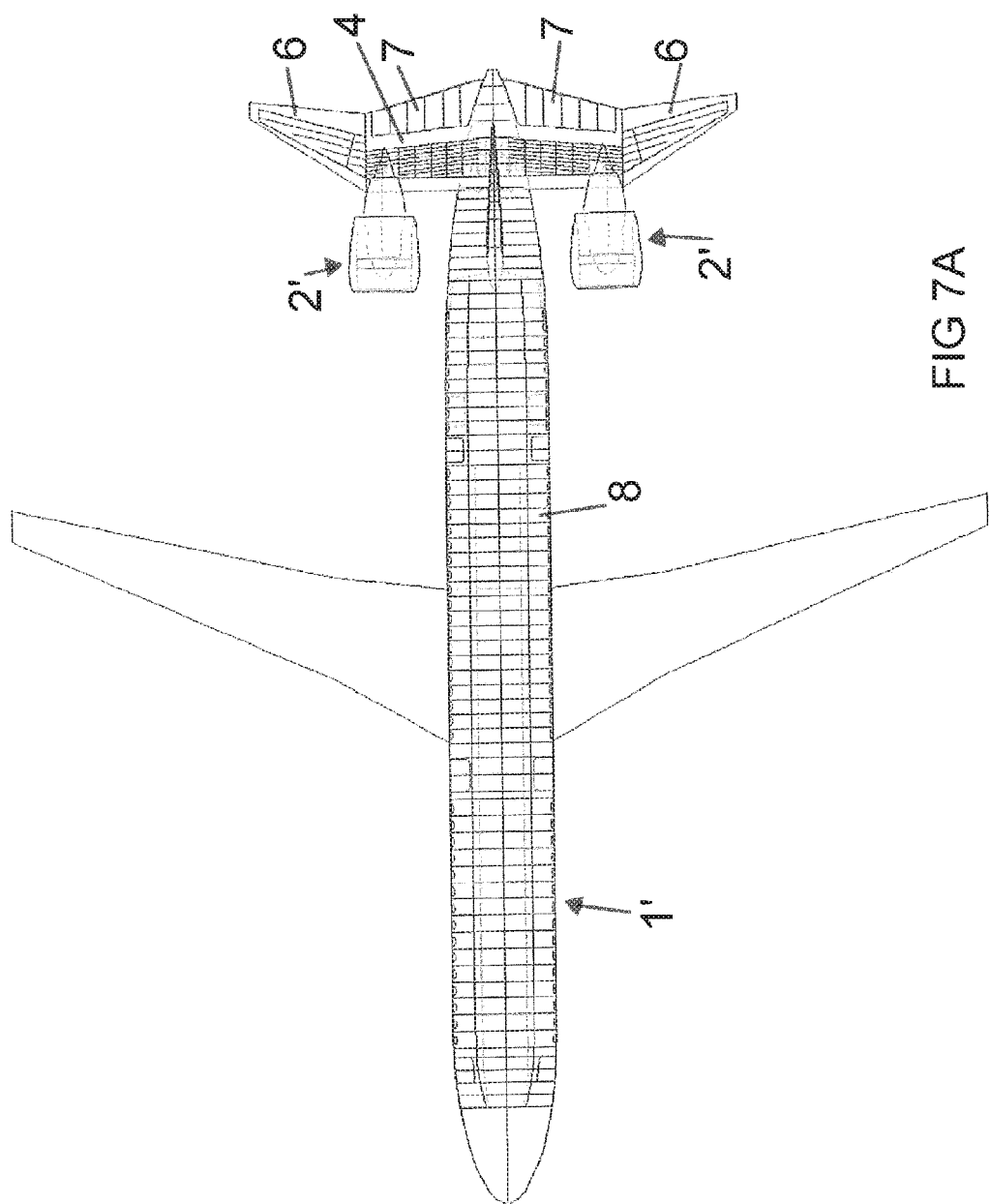
FIG. 7A is a plan view of a second aircraft of the invention.
Figure 8A:
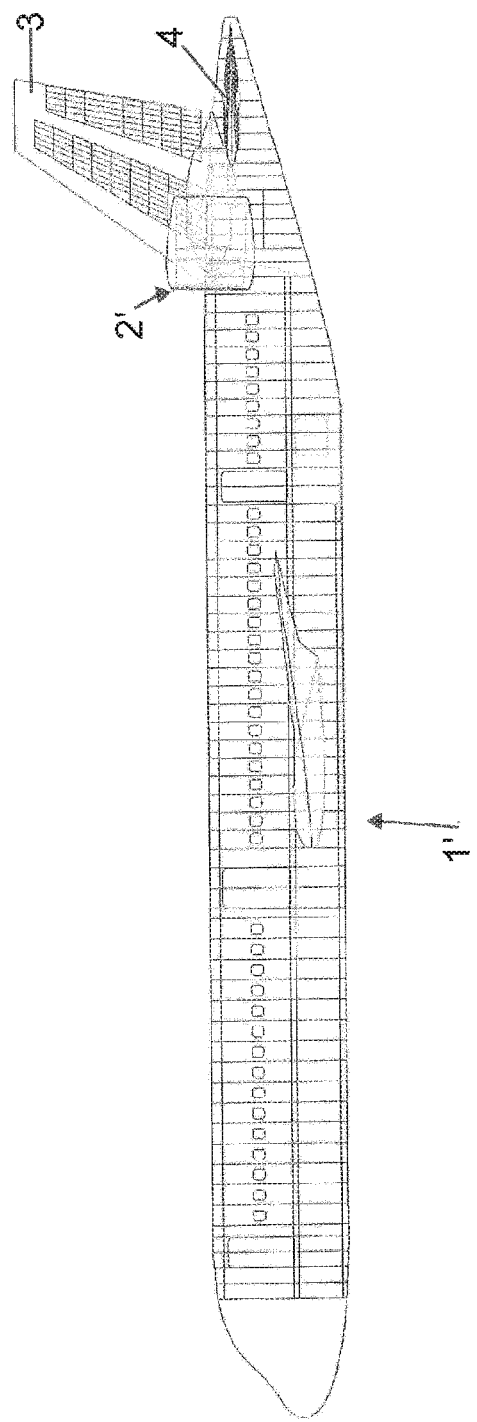
FIG. 8A is a side view of a second aircraft of the invention.
Figures 9, 10:
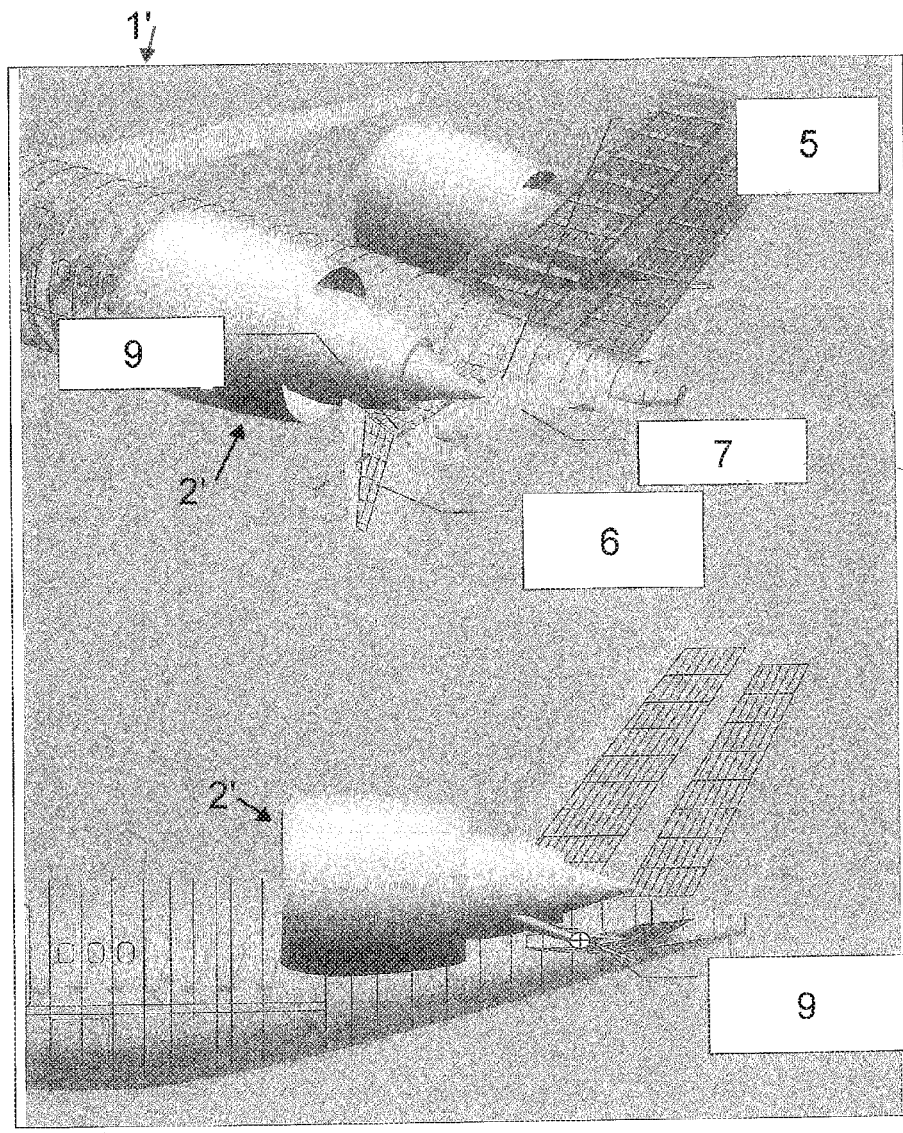
FIG. 9 shows a detail of the rear part of the perspective view of the aircraft of FIG. 6, in which the outer part of the HTP is in a different position.
FIG. 10 shows a detail of the rear part of the aircraft of FIG. 6, in which the outer part of the HTP is in a different position.
Figure 11:
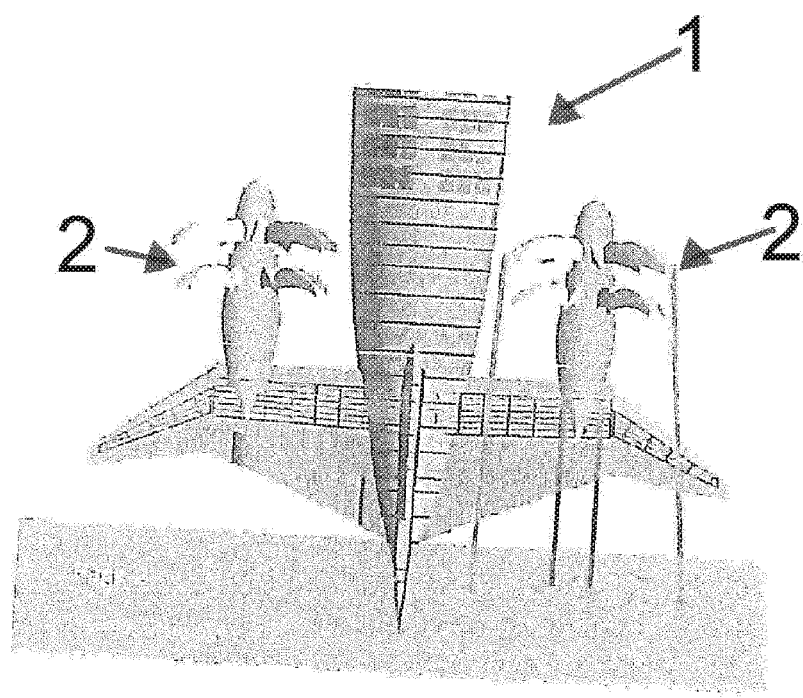
FIG. 11 shows a detail of the rear part of the aircraft of FIG. 6, with the flow coming from the engines.
Figure 12:
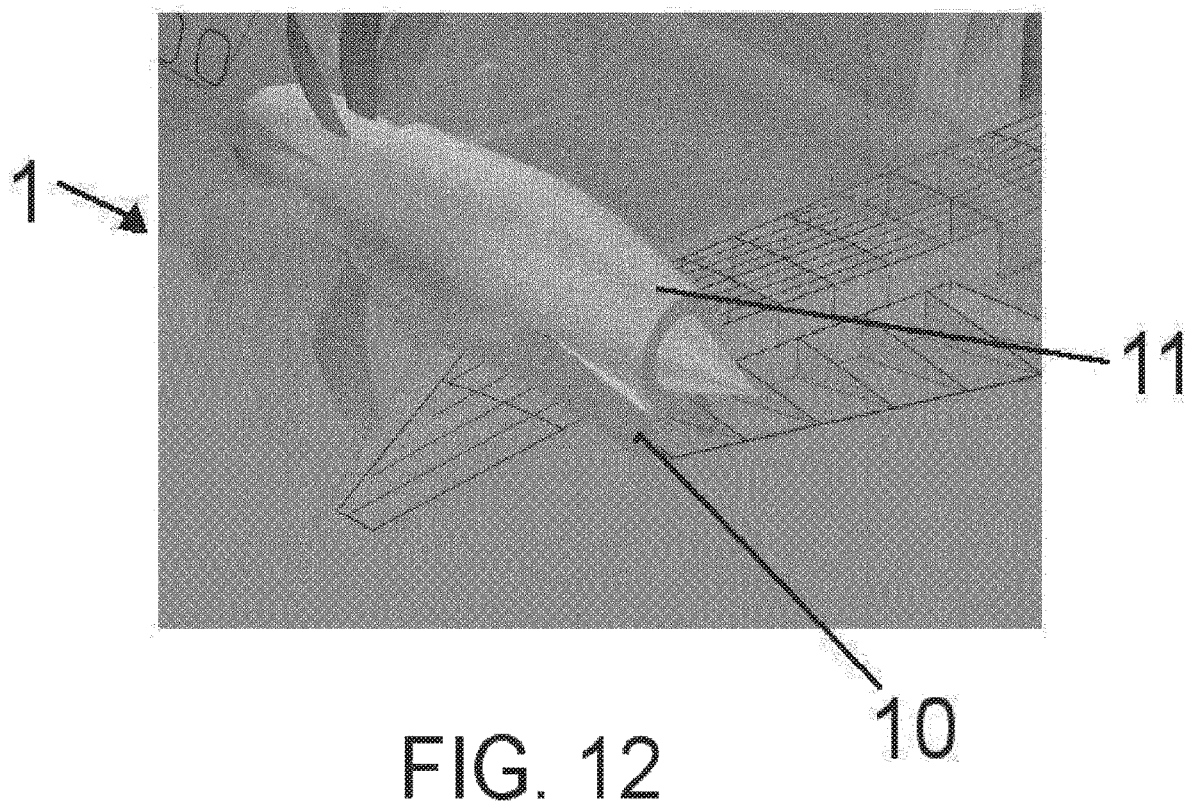
FIG. 12 shows a detail of the rear part of the aircraft of FIG. 1, with a fairing in the gap between the inner and outer part of the horizontal tail plane.

The horizontal tail plane 4 comprises:

an inner fixed part 5 attached to the fuselage 8 of the aircraft 1, 1', the inner fixed part 5 comprising an elevator 7, and two outer movable parts 6, each one of the outer movable parts 6 being located at each side end of the horizontal tail plane 4 which is furthest away from the fuselage 8 of the aircraft 1, 1', In this way both the inner fixed part 5 and the outer movable parts 6 are at least partially subjected to the flow coming from the engines 2, 2' when they are in use, as can be seen in FIG. 11.

The inner part 5 must be rigid enough to support the weight of the engine 2, 2'. This is also favored if there is no cut-out in the fuselage 8 and hence there is less loss of rigidity as normally does in current HTP configurations.

The outer part 6 can be attached to the inner part 5 at the rear spar of the inner part torsion box through a shaft 9 that can be used as a pivot to rotate the outer part 6. The shaft 9, that protrudes from the inner part 5, can be perpendicular to the fuselage 8 (see FIGS. 9 and 10). It can also have other angles with respect to the fuselage 8.

The inner part 5 can be attached to the fuselage 8 through a kind of piano junction as done for instance in the ATR wing.

This configuration of the HTP 4 also allows having a simple VTP 3 instead of the current T-tail that most of the configurations with rear mounted engines have, which has a considerable reduction on VTP weight.

The engines 2, 2' can be attached to the top surface of the horizontal tail plane 4 by means of pylons, in a similar way as done when the engines 2, 2' are attached to the wings in other aircraft configurations.

The vertical tail plane 3 can be in a forward position with respect to the horizontal tail plane 4, which can be an important feature. In effect, for CROR engines where certification authorities require to protect the engine to engine debris, the VTP 3 can be used as a shielding not penalizing so much the configuration since the VTP 3 is decoupled from the HTP 4. So if the VTP 3 is placed in a forward position with respect to the HTP 4, this HTP 4 remains at its optimal position. This is not the case if the tail arrangement is a T-tail where the HTP is on top of the VTP.

The engines 2, 2' used in the aircraft 1, 1' of the invention can be ultra high bypass ratio engines, propeller engines or contra rotating open rotor engines.

The outer movable parts 6 of the horizontal tail plane 4 and the elevator 7 of the fixed part 5 of the horizontal tail plane 4 can be moved by means of actuators.

Since the elevator 7 is blown, it can achieve larger maximum lift force before stall and this can reduce the take-off field length and reduce landing speed. But trimming the aircraft 1, 1' with only the elevator 7 is very draggy.

As a complement of the elevator 7 are the outer parts 6 which are at least partially blown and can improve much more the effect on take-off and landing. But on the other hand, they can be used to trim the aircraft 1, 1' much better than with the elevator 7, reducing considerably the drag. To achieve this, the possible gap between the inner part 5 and the outer part 6 must be minimized while the outer part 6 is rotating. To cover this gap a fairing 10 is provided, which can be embedded in the engine nacelle 11.

Although the present invention has been fully described in connection with preferred embodiments, it is evident that modifications may be introduced within the scope thereof, not considering this as limited by these embodiments, but by the contents of the following claims.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft with rear mounted engines, comprising:
   a vertical tail plane, and
   a horizontal tail plane,
   wherein the engines are mounted on top of the horizontal tail plane,
   wherein the horizontal tail plane comprises:
      an inner fixed part attached to a fuselage of the aircraft, the inner fixed part comprising an elevator, and
      two outer movable parts, each one of the outer movable parts being located at each side end of the horizontal tail plane which is furthest away from the fuselage of the aircraft such that the two outer movable parts are located on opposite sides of the vertical tail plane,
   wherein both the inner fixed part and the outer movable parts are subjected to a flow coming from the engines when the engines are in use.

2. The aircraft with rear mounted engines, according to claim 1, wherein the engines are attached to a top surface of the horizontal tail plane via pylons.

3. The aircraft with rear mounted engines, according to claim 1, wherein the vertical tail plane is in a forward position with respect to the horizontal tail plane.

4. The aircraft with rear mounted engines, according to claim 1, wherein the inner part of the horizontal tail plane is attached to the fuselage without cutouts in the fuselage.

5. The aircraft with rear mounted engines, according to claim 1, wherein the engines are ultra high bypass ratio engines.

6. The aircraft with rear mounted engines, according to claim 1, wherein the engines are propeller engines.

7. The aircraft with rear mounted engines, according to claim 1, wherein the engines are contra rotating open rotor engines.

8. The aircraft with rear mounted engines, according to claim 1, wherein the outer movable parts of the horizontal tail plane are moved via actuators.

9. The aircraft with rear mounted engines, according to claim 1, wherein the elevator of the fixed part of the horizontal tail plane is moved via actuators.

10. The aircraft with rear mounted engines, according claim 1, wherein a gap between the inner part and the outer parts of the horizontal tail plane is covered by a fairing embedded in nacelles of the engines.

11. The aircraft with rear mounted engines, according to claim 1, wherein the outer movable parts are rotatable around a shaft protruding from the inner part.

12. The aircraft with rear mounted engines, according to claim 11, wherein the shaft is perpendicular to the fuselage.

13. An aircraft with rear mounted engines, comprising:
   a vertical tail plane, and
   a horizontal tail plane,
   wherein the engines are mounted on top of the horizontal tail plane,
   wherein the horizontal tail plane comprises:
      an inner fixed part attached to a fuselage of the aircraft, the inner fixed part comprising an elevator, and
      two outer movable parts, each one of the outer movable parts being located at each side end of the horizontal tail plane which is furthest away from the fuselage of the aircraft,
   wherein both the inner fixed part and the outer movable parts are subjected to a flow coming from the engines when the engines are in use, and,
   wherein a gap between the inner part and the outer parts of the horizontal tail plane is covered by a fairing embedded in nacelles of the engines.

14. The aircraft with rear mounted engines, according to claim 13, wherein the engines are attached to a top surface of the horizontal tail plane via pylons.

15. The aircraft with rear mounted engines, according to claim 13, wherein the vertical tail plane is in a forward position with respect to the horizontal tail plane.

16. The aircraft with rear mounted engines, according to claim 13, wherein the inner part of the horizontal tail plane is attached to the fuselage without cutouts in the fuselage.

17. The aircraft with rear mounted engines, according to claim 13, wherein the outer movable parts of the horizontal tail plane are moved via actuators.

18. The aircraft with rear mounted engines, according to claim 13, wherein the elevator of the fixed part of the horizontal tail plane is moved via actuators.

19. The aircraft with rear mounted engines, according to claim 13, wherein the outer movable parts are rotatable around a shaft protruding from the inner part.

20. The aircraft with rear mounted engines, according to claim 19, wherein the shaft is perpendicular to the fuselage.

\* \* \* \* \*